(No Model.)

J. W. COREY.
CLUTCH OR LOOSE PULLEY DEVICE.

No. 322,423. Patented July 21, 1885.

Attest:
Carl Spengel,
E. B. Smith.

Inventor:
Jasper W. Corey,
by Henry Calver, Atty.

UNITED STATES PATENT OFFICE.

JASPER W. COREY, OF CINCINNATI, OHIO, ASSIGNOR TO HENRY MUHLHAUSER, OF SAME PLACE.

CLUTCH OR LOOSE-PULLEY DEVICE.

SPECIFICATION forming part of Letters Patent No. 322,423, dated July 21, 1885.

Application filed June 18, 1885. (No model.)

*To all whom it may concern:*

Be it known that I, JASPER W. COREY, a citizen of the United States, residing at Cincinnati, in the county of Hamilton and State of Ohio, have invented certain new and useful Improvements in Clutches or Loose-Pulley Devices, of which the following is a specification, reference being had therein to the accompanying drawings.

The object of my invention is to provide a simple device by which a loose pulley may be quickly and easily connected with or disconnected from its shaft, my invention relating more particularly to that class of clutches or "stop-motions" in which the pulley-connection to the shaft is made by means of a hand or fly wheel attached to the latter.

My invention is specially adapted for use in connection with sewing-machines, so that the driving-pulley may be disconnected from and thus run loosely on the shaft when the bobbins are to be wound, and thus temporarily avoid running the sewing mechanism of the machine.

In carrying my invention into effect, I attach the hand or fly wheel to the shaft by means of a set-screw or similar device, and mount the loose pulley on the shaft adjacent to the fly-wheel. The hub of the latter is provided with two recesses entered by plunger and stop-pins attached to a cap, the former of said pins being provided with a plunger, inside of which and surrounding the plunger-pin is placed a spring for retaining the cap in place and for projecting the plunger into an engaging recess in the hub of the pulley. On the outer face of the hub of the fly-wheel, extending each side of the recess for the stop-pin, is formed a small slot, affording a shoulder for the engagement of said pin when it is withdrawn from its recess.

Figure 1:
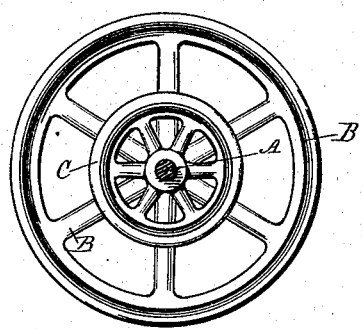
Figure 2:
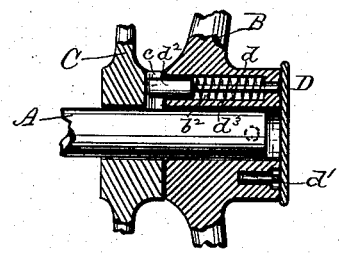
Figure 3:
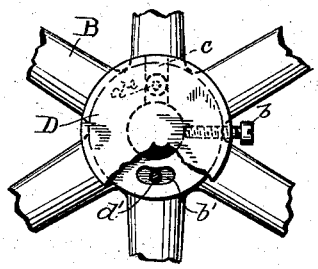

In the drawings, Figure 1 is an elevation of my device, with the shaft in section. Fig. 2 is a section through the cap and the hubs of the pulley and fly-wheel. Fig. 3 is a face view, with a portion of the cap broken away.

A indicates the shaft, and B the hand or fly wheel, attached thereto by a set-screw, $b$. C is the pulley-wheel, mounted loosely on the shaft inside of and adjacent to the fly-wheel, and having in its hub a recess, $c$. D is a cap or disk provided with pins $d$ and $d'$, loosely entering holes or recesses in the hub of the fly-wheel. The pin $d$ is provided with a plunger, $d^2$, and surrounding said pin in the recess $b^2$ of the hub of the fly-wheel is a spring, $d^3$, bearing against an interior shoulder at the end of said recess and the rear end of said plunger. Said spring thus serves to project the plunger into the recess $c$ of the pulley, as in Fig. 2, and also to retain the cap or disk D, to which the pin $d$ is attached, against the hub of the fly-wheel when the stop-pin $d'$ is in its recess, thus locking the pulley to the fly-wheel, and thereby connecting it to the shaft.

When the pulley is to be run loosely on the shaft, the disk or cap is moved outward from the hub of the fly-wheel against the stress of the spring $d^3$, thus retracting the plunger $d^2$ from the recess $c$ of the pulley and disengaging the latter from the fly-wheel. The cap or disk is then partially rotated, turning on the pin $d$ as a center, to bring the stop-pin $d'$ out of register from its hole or recess and against the shoulder formed by the slot $b'$ adjacent to the said stop-pin hole or recess, the turning movement of the cap or disk in one direction or the other being limited by the engagement of the stop-pin with the end walls of the said slot. When the plunger is thus retracted and the stop-pin $d'$ is out of its hole or recess, the friction of the said stop-pin against its bearing-shoulder, caused by the stress of the spring $d^3$, will be sufficient to keep the cap or disk from turning, and thus hold it away from the hub of the fly-wheel as long as may be desired. When the pulley is to be again connected with the shaft, the cap or disk is turned slightly to bring the stop-pin into register with its hole, and the parts will then instantly spring back to their locking positions, as in Fig. 2.

I claim as my invention—

1. The combination, with a shaft and a loose pulley the hub of which is provided with a recess, of a hand or fly wheel attached to said shaft and having two holes or recesses in its hub, a cap or disk having stop and plunger pins, the latter carrying a plunger, and a spring surrounding said plunger-pin and serving to project said plunger into the recess of the pulley and to hold said cap or disk in place, substantially as set forth.

2. The combination, with the shaft A, of the fast hand or fly wheel B, having in its hubs two holes or recesses and the slot $b'$, the loose pulley C, having recess $c$, the cap or disk D, having plunger and stop pins $d$ and $d'$, the plunger $d^2$ on the former pin, and the spring $d^3$, whereby the said loose pulley may be connected with or disconnected from its shaft, and the said cap or disk, when removed from the hub of the fly-wheel, may be turned on the plunger-pin to permit the parts to be retained in disconnected position by the said spring, substantially as set forth.

In testimony whereof I affix my signature in presence of two witnesses.

JASPER W. COREY.

Witnesses:
J. A. STOEHR,
S. E. HENDERSON.